United States Patent [19]

Charles et al.

[11] Patent Number: 4,523,996
[45] Date of Patent: Jun. 18, 1985

[54] METHOD OF SEPARATING CATIONIC FROM ANIONIC BEADS IN MIXED RESIN BEDS

[75] Inventors: Robert G. Charles, Allison Park; William M. Hickam, Pittsburgh, both of Pa.

[73] Assignee: Westinghouse Electric Corp., Pittsburgh, Pa.

[21] Appl. No.: 582,341

[22] Filed: Feb. 22, 1984

[51] Int. Cl.³ .............................................. B01J 47/06
[52] U.S. Cl. ...................................... 210/504; 209/8; 210/679; 210/686; 521/28
[58] Field of Search ...................... 209/38–40, 209/478, 4, 8, 11; 210/676, 679, 686, 222, 223, 290, 504; 521/28

[56] References Cited

U.S. PATENT DOCUMENTS

| | | | |
|---|---|---|---|
| 2,642,514 | 6/1953 | Herkenhoff | 210/686 |
| 3,607,740 | 9/1971 | Akeroyd | 210/676 |
| 4,314,905 | 2/1982 | Etzel et al. | 210/679 |

OTHER PUBLICATIONS

Chen; James Y. et al., "New Approach of Resin Separation in Condensate Polisher Application", Proceedings 43rd International Water Conference, Pittsburgh, PA, Oct. 25–27, 1982, pp. 21–31.

*Magnetochemistry*, 2nd Ed., Pierce W. Selwood, Interscience Pub. Inc., 1956, p. 287.

Primary Examiner—Ivars Cintins
Attorney, Agent, or Firm—D. C. Abeles

[57] ABSTRACT

A ferromagnetic material is integrally incorporated with each of the ionic beads of one component of a mixed ionic resin bed containing more than one ionic bead component, such that the one ionic bead component can be separated from the other component by attraction to a magnetic field. Ionic beads containing a ferromagnetic material are attracted to an inhomogeneous magnetic field while other ionic beads devoid of the ferromagnetic material are not so attracted. In another embodiment, a ferromagnetic material having a specific Curie temperature may be incorporated with one ionic bead component while the other bead component contains a different ferromagnetic material having a different Curie temperature.

14 Claims, 4 Drawing Figures

METHOD OF SEPARATING CATIONIC FROM ANIONIC BEADS IN MIXED RESIN BEDS

FIELD OF THE INVENTION

The present invention relates to a method for the efficient separation of cationic resin beads from anionic resin beads contained in a mixed resin bed. The invention also relates to mixed resin beds containing a cationic bead resin component and an anionic bead resin component, wherein the beads of one of the bead components have a ferromagnetic material incorporated therewith.

BACKGROUND OF THE INVENTION

The use of mixed resin beads, which contain a supply of cationic resin beads and a supply of anionic resin beads, for the removal of impurities from water is well-known. In power plants, for example, where vast quantities of water are recycled through a power generating unit containing a steam generator, a condenser, and a circulating system, mixed bed resin demineralizers or polishers are used to remove impurities that are picked up by the recirculating water so as to reduce or prevent corrosion to the components of the system by such impurities. Such mixed resin beds may also be used to purify make-up plant water.

Mixed bed polishers, which normally are provided in such power plant systems to remove impurities from the condensate discharged from a condenser, contain both cationic and anionic resin beads in a common polisher unit. A plurality of the mixed bed polishers are normally provided so that when the resin components of one mixed bed become saturated, that bed can be removed from operation so the beads can be regenerated, while the flow through the power plant system can continue through an alternate bed.

In order to regenerate the beads contained in a mixed resin bed, the cationic bead component must be treated separately from the anionic bead component. The cationic bead resin, for example, might be regenerated by contact with an acidic compound such as sulfuric acid, while the anionic bead resin might be regenerated by contact with a basic compound such as sodium hydroxide.

While, as previously discussed, the cationic beads are generally more dense than the anionic beads and gravity separation can be effected to an extent, a mixture of the bead components will tend to remain at the interface of the cationic bead and anionic bead components of the bed, and complete separation is extremely difficult. The presence of one of the bead components in the other bead component during regeneration results in release of undesirable impurities in the resin bed after it has been returned to service and inefficient operation of the mixed bed.

Attempts have previously been made to provide a process for the complete and efficient separation of the resin bead components of a mixed resin bed so that regeneration of each component can be readily, efficiently and economically effected. In "New Approach of Resin Separation in Condensate Polisher Application", James Y. Chen and James Nichols, presented at the Proceedings 43rd International Water Conference, Pittsburgh, Pa., Oct. 25-27, 1982, pp. 21-31, the problems associated with separation of cationic resin beads from anionic resin beads, from a mixed resin bed are discussed, and methods of separation are described which use optimum density and particle sizes for the cation and anion resins, use inert resin beads with specially sized macroporous resins, and use high concentration caustic soda to separate anion resin beads and particles from cation beads and particles by floatation of the lighter anion resin after primary separation is completed.

It is an object of the present invention to provide a mixed resin bed which contains resin bead components that are easily separable from each other.

It is another object of the present invention to provide an improved process for separating a cationic bead component from an anionic bead component, where both bead components are contained in a resin bed.

SUMMARY OF THE INVENTION

A mixed resin bed which contains a mixture of cationic and anionic resin bead components is readily separated into the ionic resin bead components by incorporating a ferromagnetic material integrally with the beads of one of the bead components. The incorporation of the ferromagnetic material into the beads of one of the bead components renders those beads magnetically attractive to an applied, inhomogeneous magnetic field, whereas the beads of the other bead component are not so attracted.

The ferromagnetic material may be incorporated within the resin beads, or it can be affixed to the surface of the beads, or a plurality of the beads may be affixed to a core of ferromagnetic material.

The process for separating the bead components is effected by integrally incorporating a ferromagnetic material with the beads of one of the bead components of a mixed resin bed, exposing a mixture of beads in the resin bed to an inhomogeneous magnetic field, whereby the one bead component containing the ferromagnetic material is attracted by the magnetic field while the other bead component remains unattracted, and separating the one bead component from the other bead component.

In one embodiment of the present invention, one type of ferromagnetic material having a first known Curie point is incorporated with the beads of one of the components of the resin bead while another type of ferromagnetic material having a second known Curie point, different from that of the first known Curie point, is incorporated with the beads of the other component of the resin bed.

DETAILED DESCRIPTION

In accordance with the present invention, mixed resin beads are provided which contain an anionic bead component and a cationic bead component, with at least one of the bead components comprised of ionic resin beads having incorporated therewith a ferromagnetic material. The incorporation of a ferromagnetic material with each of the beads enables the separation of one of the bead components and mixing of the resin bed, by the use of an applied magnetic field. In instances where a ferromagnetic material is added to the beads of both components, the Curie point of the ferromagnetic material added to the beads of one component is sufficiently distinct from the Curie point of the ferromagnetic material added to the beads of the other component such that either of the bead components may be attracted by a magnetic field under conditions where the other bead component is not attracted.

Figure 1:
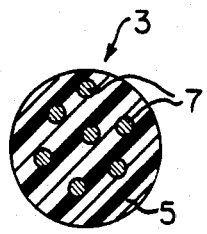
FIG. 1 illustrates a cross-section of an embodiment of an ionic resin bead wherein a ferromagnetic material is incorporated within the bead.

In a preferred embodiment, the ferromagnetic material is incorporated within the ionic resin bead. As illustrated in FIG. 1, an ionic resin bead 3 may be formed as a sphere of resin 5 with ferromagnetic material 7 incorporated therein. The ionic resin bead may be an anionic resin bead or a cationic resin bead, depending upon which component of a bead mixture is to be acted on by an applied inhomogeneous magnetic field so as to be attracted thereby. Generally, ionic resin beads fall within a size range of between about 10–100 microns in diameter. Where a ferromagnetic material is incorporated into the resin beads, the size of the ferromagnetic material in a range of about 3–5 microns would be suitable. Generally, however, since the bead size will vary, the size of the ferromagnetic materials should be such that between about 1–10 particles would be incorporated into each bead. Such particles, although illustrated as being spherical, may be in the form of other discrete physical shapes such as elongated needles, platelets, or irregular fragments.

Figure 2:
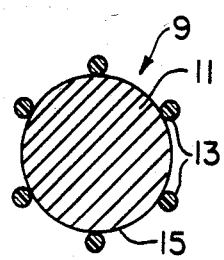
FIG. 2 illustrates a cross-section of an embodiment wherein a plurality of ionic resin beads are affixed to the surface of a core of ferromagnetic material.
Figure 3:
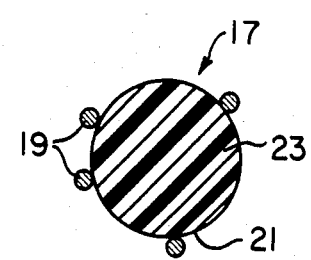
FIG. 3 illustrates a cross-section of an embodiment wherein a ferromagnetic material is affixed to the surface of an ionic resin bead.

In the embodiment illustrated in FIG. 2, the ionic resin beads 9 are provided in a form where a central ferromagnetic body or core 11 is provided with a plurality of ionic resin bead portions 13 affixed on the outer surface 15 of the core 11. The size of the ferromagnetic core may vary but should be a size sufficient that a plurality of resin beads can be affixed about the core, and a size generally on the order of ten times or more of the size of the diameter of the beads affixed thereto. The beads may be so affixed by the use of an adhesive or other means. In a further embodiment illustrated in FIG. 3, the ionic resin beads 17 are provided in a form where fine particles of the ferromagnetic material 19 are affixed to the outer surface 21 of an ionic resin bead 23. In this embodiment, where the ferromagnetic material is affixed to the surface of the beads, the ferromagnetic material should be of a size and quantity that only about 10–20 percent of the surface area of the resin bead is covered, so as to leave about 80–90% of the resin bead surface available for ion transfer.

In all of the embodiments of the present invention, the mixture of ionic beads contains at least one component of beads which have integrally incorporated therewith a ferromagnetic material.

The term ferromagnetic is used to define a material whose magnetic properties are like those of iron. Such materials have enormous susceptibility at low fields and a specific magnetism which is a function of field up to the field at which the material is said to be saturated. As explained in *Magnetochemistry*, Second Edition, Pierce W. Selwood, Interscience Publishers, Inc., 1956, p. 287, ". . . If the specific magnetization of a ferromagnetic substance is determined as a function of temperature, it will be found that above a certain fairly well-defined temperature, the induction drops nearly to zero. This is to say, the substance looses its ferromagnetism and becomes merely paramagnetic. The temperature at which this occurs is known as the Curie point."

The ferromagnetic materials used in the present invention should have a relatively high specific magnetization, a specific magnetization of about 20 emu/g or higher, and be chemically inert relative to the system in which they are used. Examples of such ferromagnetic materials are magnetite ($Fe_3O_4$), and other ferrites, such as those of the general formula $MO \cdot Fe_2O_3$, wherein M is a divalent metal, such as Fe, Ni, Mn, Mg, Cu, and the like; mixed ferrites such as those of the general formula $(M_xM^1_{1-x})O \cdot Fe_2O_3$ wherein M and $M^1$ are different metals selected from the divalent metals aforedescribed, as well as Zn; $\sigma - Fe_2O_3$; and the metals Fe, Ni, Co, Gd, their alloys and intermetallic compounds, for example, a ferromagentic copper-nickel alloy.

The incorporation of the ferromagnetic material with the resin beads enables the separation of those beads from a mixture with other resin beads by application to the mixture of an inhomogeneous magnetic field. The application of the inhomogeneous magnetic field will selectively attract those resin beads having incorporated therewith the magnetic material with a force (f) defined as:

$$f = m\sigma dH/dx$$

where m is the mass of the ferromagnetic material, $\sigma$ a temperature-dependent constant characteristic of the magnetic material (the specific magnetization), and $dH/dx$ is the magnetic field gradient. By using a reasonable percentage of the ferromagnetic material of high $\sigma$, neither the magnetic field strength (H) nor $dH/dx$ need be exceptionally large.

Figure 4:
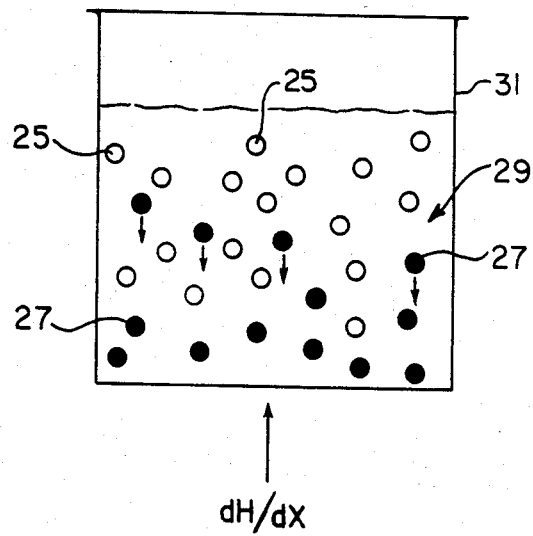
FIG. 4 schematically illustrates a separation of one bead component from another bead component according to the present invention using a magnetic field to preferentially attract beads having a ferromagnetic material incorporated therewith.

As an embodiment for use in separating one ionic bead component from another ionic bead component, reference is made to the schematic illustration of FIG. 4. As illustrated, a mixture of anionic resin beads 25 (empty circles) and cationic resin beads 27 (full circles) are suspended within a liquid 29, contained in a vessel 31. The cationic beads 27, in this instance have incorporated therewith a ferromagnetic material, while the anionic beads 25 have no ferromagnetic material incorporated therewith. Upon application of a magnetic gradient, which can be created by a permanent magnet or an electromagnet, to the bottom of the vessel, as indicated by the arrow ($dH/dx$), the force, $f = m\sigma dH/dx$, will attract the cationic beads 27 preferentially to the bottom of the vessel (small arrows) while no such attraction will occur relative to anionic beads 25. Although cationic beads are generally more dense and thus gravity will aid in preferential drawing of such beads to the bottom of the vessel, the magnetic attraction will provide a cumulative effect to cause faster and more distinct separation of the cationic beads from the anionic beads.

The embodiments illustrated in FIG. 4, is only one separation embodiment and others would be usable. For example, the force f could be applied to oppose gravity, or the force f could be applied toward the side of the vessel.

In another embodiment for separation of a bead component from a mixture of ionic resin beads containing a cationic bead component and or anionic bead component, one ferromagnetic material may be added to the beads of one component while a second ferromagnetic material may be added to the beads of the other component. For example, a ferromagnetic material having a Curie point Tc1 would be incorporated with the ionic resin beads of one component of a mixture, and a different ferromagnetic material having a Curie point Tc2 would be incorporated with the resin beads of the ionic resin beads of the other component of the mixture, where Tc2>Tc1. By applying a magnetic field to the mixture in the temperature range between Tc1 and Tc2, the other bead component would be attracted selectively. At temperatures above Tc2, neither of the bead components would be attracted to the magnetic field, while at temperatures below Tc1, both of the bead components would be attracted to the magnetic field. Where both bead components contain a ferromagnetic material, the Curie points of the two different materials should be at least 20° C. apart, and preferably on the order of 50° C. apart in order to effect efficient separation. It should be noted that ferromagnetic materials which have almost any desired Curie point can be prepared by employing suitable ferromagnetic alloys or ferrites of the proper composition.

The separation methods using a ferromagnetic material incorporated in at least one of the bead components of a mixture of ionic resin beads would require only moderate magnetic fields and simple equipment. The elaborate and sophisticated procedures characteristic of high-field magnetic separations would not be required.

What is claimed is:

1. In a mixed resin bed containing a mixture of ionic resin beads, said mixture comprising an anionic bead component and a cationic bead component, the improvement wherein each of the resin beads of one of said bead components has integrally incorporated therewith a first ferromagnetic material having a first Curie point, and each of the resin beads of the other bead component has integrally incorporated therewith a second ferromagnetic material having a second Curie point different from said first Curie point, so as to render said one bead component magnetically attractive under an applied inhomogeneous magnetic field at a different temperature than said other bead component is rendered magnetically attractive.

2. In a mixed resin bed as defined in claim 1, the improvement wherein said ferromagnetic material is integrally incorporated within each of the resin beads of said one bed component.

3. In a mixed resin bed as defined in claim 1, the improvement wherein said ferromagnetic material is affixed to the surface of each of the resin beads of said one bead component.

4. In a mixed resin bed as defined in claim 1, the improvement wherein said ferromagnetic material comprises core portions with a plurality of the resin beads of said one bead component affixed to said core portions.

5. In a mixed resin bed as defined in claim 1, the improvement wherein said ferromagnetic material is selected from the group consisting of magnetite, $\sigma$-$Fe_2O_3$, and a ferrite of the formula:

$$MO.Fe_2O_3$$

wherein M is a divalent metal selected from iron, nickel, manganese, magnesium, and copper.

6. In a mixed resin bed as defined in claim 1, the improvement wherein said ferromagnetic material is selected from a mixed ferrite having the formula:

$$(M_xM^1_{1-x})O.Fe_2O_3$$

wherein M and $M^1$ are different metals selected from the group consisting of iron, nickel, cobalt, manganese, magnesium, copper, and zinc.

7. In a mixed resin bed as defined in claim 1, the improvement wherein said ferromagnetic material is selected from the group consisting of iron, nickel, cobalt, cadmium, gadolinium, and alloys and intermetallic compounds thereof.

8. A process for treating a mixture of ionic resin beads, containing an anionic resin bead component and a cationic resin bead component, to separate a said bead component therefrom comprising:
   integrally incorporating a first ferromagnetic material with each of the resin beads of one of said bead components, said first ferromagnetic material having a first Curie point Tc1, so as to render the same magnetically attractive under an applied magnetic field, below a first temperature;
   integrally incorporating a second ferromagnetic material with each of said resin beads of the other said bead component, said second ferromagnetic material having a second Curie point Tc2 different from said Curic point Tc1, so as to render the same magnetically attractive under an applied magnetic field below a second temperature;
   exposing said mixture of ionic resin beads to an inhomogeneous magnetic field, at a temperature between said first and second Curie point Tc1 and Tc2 whereby one of said bead components is attracted by said magnetic field while said other bead components is unattracted; and
   separating said one bead component from said other bead component.

9. The process as defined in claim 8 wherein said ferromagnetic material is integrally incorporated within each of the resin beads of said one bead component.

10. The process as defined in claim 8 wherein said ferromagnetic material is affixed to the surface of each of the resin beads of said one bead component.

11. The process as defined in claim 8 wherein said ferromagnetic material comprises core portions with a plurality of the resin beads of said one bead component affixed to said core portions.

12. The process as defined in claim 8, wherein said ferromagnetic material is selected from the group consisting of magnetite, $\sigma$-$Fe_2O_3$, and a ferrite of the formula:

$$MO.Fe_2O_3$$

where M is a divalent metal selected from iron, nickel, manganese and magnesium.

13. The process as defined in claim 8, wherein said ferromagnetic material is selected from the group consisting of iron, nickel, cobalt, gadolinium, and alloys and intermetallic compounds thereof.

14. The process as defined in claim 8, wherein said ferromagnetic material is selected from a mixed ferrite having the formula:

$$(M_xM^1_{1-x})O.Fe_2O_3$$

wherein M and $M^1$ are different metals selected from the group consisting of iron, nickel, cobalt, manganese, magnesium, copper, and zinc.

* * * * *